(12) United States Patent
Kamata et al.

(10) Patent No.: US 8,531,749 B2
(45) Date of Patent: Sep. 10, 2013

(54) LIGHT DEFLECTION APPARATUS

(75) Inventors: Ryuji Kamata, Hachioji (JP); Takaaki Kurosawa, Kodaira (JP); Naohiro Ohno, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 246 days.

(21) Appl. No.: 12/832,088

(22) Filed: Jul. 8, 2010

(65) Prior Publication Data

US 2011/0013250 A1      Jan. 20, 2011

(30) Foreign Application Priority Data

Jul. 14, 2009    (JP) .................. 2009-165435

(51) Int. Cl.
*G02B 26/08*        (2006.01)

(52) U.S. Cl.
USPC .............. 359/200.3; 359/200.7; 310/180; 310/67 R

(58) Field of Classification Search
USPC ..... 359/197.1, 199.1, 200.1–200.5; 310/179, 310/180, 67 R
See application file for complete search history.

(56) References Cited

U.S. PATENT DOCUMENTS

| | | | |
|---|---|---|---|
| 6,702,464 B1 | 3/2004 | Takeuchi et al. | |
| 7,622,837 B2 * | 11/2009 | Saito et al. | 310/90 |
| 2004/0156569 A1 | 8/2004 | Takeuchi et al. | |
| 2006/0208179 A1 * | 9/2006 | Itami | 250/234 |

FOREIGN PATENT DOCUMENTS

| | | |
|---|---|---|
| JP | 63-17322 U | 2/1988 |
| JP | 4-22712 U | 2/1992 |
| JP | 04-050914 A | 2/1992 |
| JP | 4-65311 U | 6/1992 |
| JP | 7-20397 A | 1/1995 |
| JP | 8-5948 A | 1/1996 |
| JP | 8-196056 A | 7/1996 |
| JP | 61-294409 A | 12/1996 |
| WO | WO 01/21969 A1 | 3/2001 |

OTHER PUBLICATIONS

Japanese Office Action dated Nov. 6, 2012 (and English translation thereof) in counterpart Japanese Application No. 2009-165435.

* cited by examiner

*Primary Examiner* — Jennifer L. Doak
(74) *Attorney, Agent, or Firm* — Holtz, Holtz, Goodman & Chick, PC

(57) ABSTRACT

A light deflection apparatus, including a stator section including a radial bearing having a first dynamic pressure generating groove, a thrust bearing having a second dynamic pressure generating groove, and a stator coil; and, a rotor section including a polygon minor, a magnet facing the stator coil, and a rotating body having a dynamic pressure surface facing the radial bearing and a dynamic pressure surface facing the thrust bearing, the rotor supporting the polygon minor and the magnet; wherein one end portion of the dynamic pressure bearing section included of the thrust bearing, the radial bearing and of the rotating body in the thrust direction is closed excluding a gap between the dynamic pressure bearing section of the radial bearing and the dynamic pressure bearing section of the rotating body.

9 Claims, 5 Drawing Sheets

LIGHT DEFLECTION APPARATUS

RELATED APPLICATION

The present application is based on Patent Application No. 2009-165435 filed at the Japan Patent Office on Jul. 14, 2009 and which is hereby incorporated herein in its entirety.

TECHNICAL FIELD

The present invention relates to a light deflection apparatus having therein a polygon mirror (rotating polygon mirror) that is used for an image forming apparatus such as a copying machine, a laser printer and a laser facsimile machine.

BACKGROUND

In the image forming apparatus such as a laser printer, a laser beam is caused to enter the polygon mirror (rotating polygon mirror) rotating at high-speed of the light deflection apparatus, based on information which has been read out as a measure to write in the image, and thereby, the rotation of the polygon minor forms a scanning beam which gives scanning exposure to a photoreceptor, thus, an image is formed on the photoreceptor.

In the light deflection apparatus wherein the polygon mirror is rotated as a rotor section, high speed rotation of the polygon mirror is carried out, by supporting the rotor section with a dynamic pressure bearing.

In general, a rotation mechanism employing the dynamic pressure bearing is one having therein a thrust bearing, a radial bearing and a rotor section that can rotate against these dynamic pressure bearings, wherein an air gap with a thickness of several µm is formed by air pressure between a pressure surface of the rotor section and a pressure surface of the dynamic pressure bearing which face each other, and by the rotation of the rotor section and by actions of a dynamic pressure generating groove provided on the dynamic pressure bearing, to reduce resistance between the dynamic pressure bearing and the rotor section, thus, the high-speed rotation is possible.

Each of Unexamined Japanese Patent Application Publication No. 8-196056 and Unexamined Japanese Patent Application Publication No. 7-20397 discloses a light deflection apparatus employing a dynamic pressure bearing.

In Unexamined Japanese Patent Application Publication No. 8-196056, dynamic pressure is generated between a radial bearing and a rotor section, while, in the thrust direction, the rotor section having the polygon mirror is caused to float by magnetic suction force by a permanent magnet provided on the radial bearing and by a magnetic body provided on the rotor section. On the end portion in the thrust direction, there is provided an orifice that causes air to circulate.

Even in Unexamined Japanese Patent Application Publication No. 7-20397, dynamic pressure is caused to be generated between the radial bearing and the rotor section, and the rotor section is caused to float by magnetic suction force by a permanent magnet provided on the radial bearing and by a magnetic body provided on the rotor section, in the same way as in Unexamined Japanese Patent Application Publication No. 8-196056. On the end portion in the thrust direction in each of Unexamined Japanese Patent Application Publication No. 8-196056 and Unexamined Japanese Patent Application Publication No. 7-20397, there is provided a ventilation hole for air ventilation on a cover body so that air may be ventilated between the dynamic pressure bearing and the outside.

[Patent Document 1] Unexamined Japanese Patent Application Publication No. 8-196056

[Patent Document 1] Unexamined Japanese Patent Application Publication No. 7-20397

In each of Unexamined Japanese Patent Application Publication No. 8-196056 and Unexamined Japanese Patent Application Publication No. 7-20397, the rotor section is caused to float by magnetic suction force between a permanent magnet provided on the dynamic pressure bearing and a magnetic body provided on the rotor section, so that it may be rotated. Then, it causes an air current generated on the dynamic pressure bearing to be ventilated at an end portion in the thrust direction.

In the rotation mechanism wherein an air is ventilated with the outside at the end portion in the thrust direction of the dynamic pressure bearing, as in Unexamined Japanese Patent Application Publication No. 8-196056 and Unexamined Japanese Patent Application Publication No. 7-20397, there is a problem that the rotation mechanism is easily affected by the outside. The problem to be affected easily from the outside is as follows specifically. That is, when shocks or forces are inflicted on the rotation mechanism having therein dynamic pressure bearing sections, there is sometimes an occasion when a trouble that a rotor section comes off takes place. The rotation mechanism having therein the dynamic pressure bearing, sometimes has an occasion wherein the rotor section takes a lower position against the dynamic pressure bearing, because of the relationship with other parts which were incorporated in the case of subassembly of the rotation mechanism. Under this condition, the rotor section comes off in particular, because gravity acts on the rotor section as a force to separate the rotor section from the dynamic pressure bearing.

An objective of the invention is to solve the problem in the conventional rotation mechanism having therein a dynamic pressure bearing, namely to solve the problem that the conventional rotation mechanism is weak against shocks or forces inflicted from the outside.

The aforesaid objective is attained by the following constructions.

SUMMARY (1) To achieve at least one of the abovementioned objects, a light deflection apparatus reflecting one aspect of the present invention includes a stator section including a radial bearing having a first dynamic pressure generating groove, a thrust bearing having a second dynamic pressure generating groove, and a stator coil; and, a rotor section including a polygon mirror, a magnet facing the stator coil, and a rotating body having a dynamic pressure surface facing the radial bearing and a dynamic pressure surface facing the thrust bearing, the rotor supporting the polygon mirror and the magnet wherein one end portion of the dynamic pressure bearing section included of the thrust bearing, the radial bearing and of the rotating body in the thrust direction is closed excluding a gap between the dynamic pressure bearing section of the radial bearing and the dynamic pressure bearing section of the rotating body.

(2) In the abovementioned light deflection apparatus of item 1, wherein the one end portion in the thrust direction of the dynamic pressure bearing section communicates with an outside through the gap between the dynamic pressure bearing section of the radial bearing and the dynamic pressure bearing section of the rotating body.

(3) In the abovementioned light deflection apparatus of item 1, wherein the dynamic pressure generating groove is asymmetric about a center line of the thrust direction.
(4) In the abovementioned light deflection apparatus of item 1, wherein at least one of a depth of the groove, an inclination angle of the groove or a length of the groove of the dynamic pressure generating groove is asymmetric about the center line.
(5) In the abovementioned light deflection apparatus of items, wherein the stator coil and the magnet are arranged to face each other in the thrust direction and in parallel.
(6) In the abovementioned light deflection apparatus of item 1, wherein the rotor section takes an upper position against the stator section.
(7) In the abovementioned light deflection apparatus of item 1, wherein the rotor section takes a lower position against the stator section.
(8) In the abovementioned light deflection apparatus of item 1, wherein the rotor section comprises a closed member closing one end portion of the thrust direction in the dynamic pressure bearing.
(9) In the abovementioned light deflection apparatus of item 1, wherein the materials for the rotating body and the closed member are the same.

DESCRIPTION OF THE PREFERRED EMBODIMENTS

The invention will be explained as follows based on the embodiment of the invention, to which, however, the invention is not limited.

Figure 1:
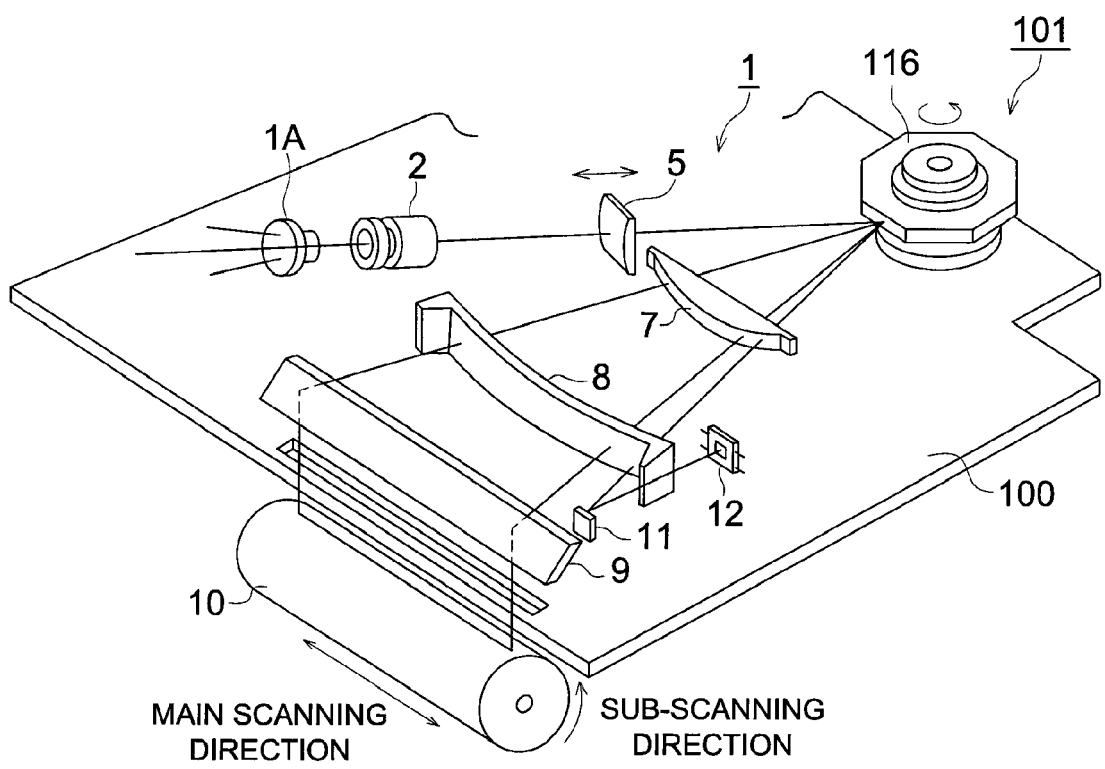
FIG. 1 is a perspective view showing an example of a beam scanning optical apparatus employing a light deflection apparatus relating to the embodiment of the invention.

FIG. 1 is a perspective view showing an example of beam scanning optical apparatus 1 employing light deflection apparatus 101 relating to the embodiment of the invention.

In FIG. 1, the numeral 100 represents a base plate to be mounted thereon, 1A represents a semiconductor laser emitter that emits a beam, 2 represents a collimator lens (beam-forming optical system), 5 represents first cylindrical lens, 116 represents a polygon minor, 7 represents an f0 lens, 8 represents second cylindrical lens, 9 represents a reflecting minor and 10 represents a photoreceptor drum, respectively. Meanwhile, 11 represents a mirror for detecting timing and 12 represents a synchronization detector. An optical beam emitted from semiconductor laser emitter 1A is made to be a parallel light by collimator lens 2. The optical beam passes through the first cylindrical lens of the first image forming optical system, and enters rotating polygon mirror 116 to be reflected. The reflected optical beam is transmitted through the second image forming optical system composed of f0 lens 7 and second cylindrical lens 8, and enters photoreceptor drum 10 through reflecting mirror 9, while having a prescribed spot diameter for scanning in the main scanning direction. Incidentally, synchronization detection for each one line is conducted by causing a light flux before the start of main scanning to enter a synchronization detector 12 through mirror 11.

Figure 2:
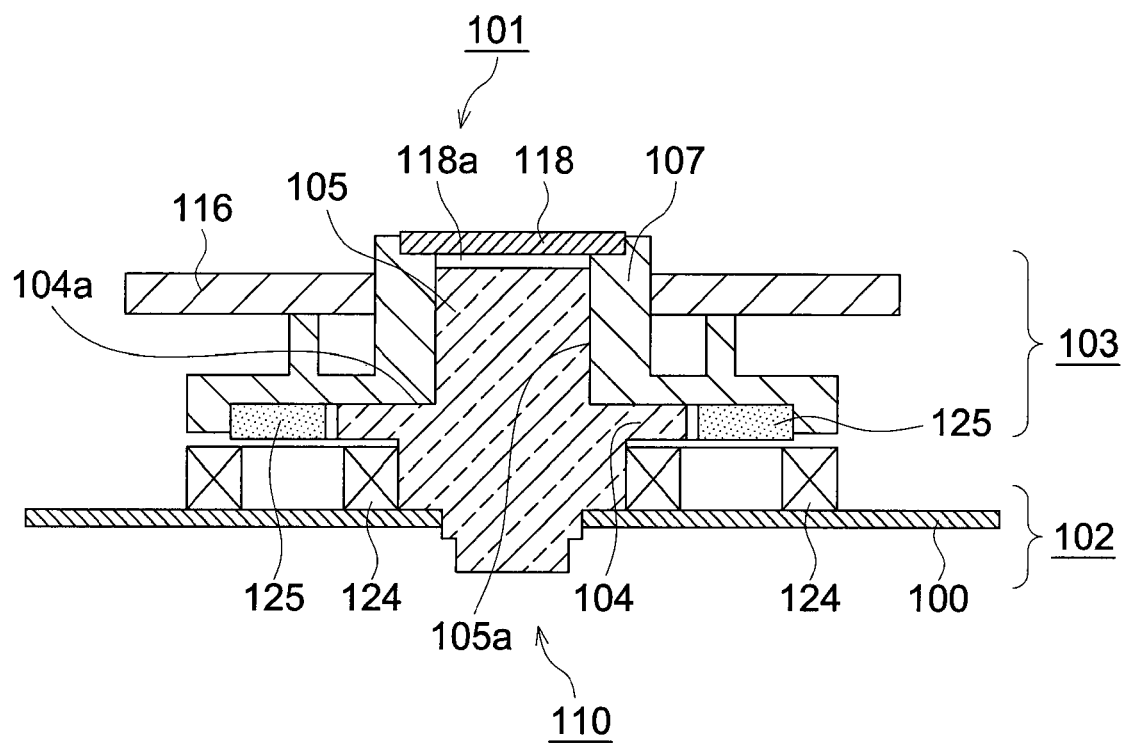
FIG. 2 is an enlarged diagram of a sectional view showing an entire structure of an example of a light deflection apparatus relating to the embodiment of the invention.

FIG. 2 is an enlarged diagram of a sectional view showing an entire structure of an example of a light deflection apparatus relating to the embodiment of the invention. having a dynamic pressure bearing section. Light deflection apparatus 101 is composed of stator section 102 and rotor section 103.

Stator section 102 is fixed on the base plate 100, and it has therein thrust bearing 104, radial bearing 105 and stator coil 124. Each of the thrust bearing 104 and the radial bearing 105 is composed of one piece member 110, and dynamic pressure generating groove 104b is formed on dynamic pressure surface 104a of thrust bearing 104, while, dynamic pressure generating groove 105b is formed on dynamic pressure surface 105a of radial bearing 105, as will be explained later.

The rotor section 103 has therein rotating body 107, magnet 125 and polygon mirror 116. These members constituting the rotor section 103 rotate solidly. The thrust bearing 104, the radial bearing 105 and the rotating body 107 form a dynamic pressure bearing section by which the rotating body 107 is supported with dynamic pressure formed by air in the case of rotation. A bottom surface of the rotating body 107 forms a dynamic pressure surface that faces the dynamic pressure surface 104a of the thrust bearing 104, an inner circumferential surface of the rotating body 107 forms a dynamic pressure surface that faces dynamic pressure surface 105a of radial bearing 105. The thrust bearing 104, the radial bearing 105 and the rotating body 107 are processed accurately, so that a clearance between a dynamic pressure surface (bottom surface) of the rotating body 107 and the dynamic pressure surface 104a and a clearance between a dynamic pressure surface (inner circumferential surface) of the rotating body 107 and the dynamic pressure surface 105a may be within a range of 1-7 µm respectively.

On the rotating body 107, there are fixed polygon mirror 116, closed member 118 and magnet 125. The polygon mirror 116 represents a rotor section of a polygonal form, and its outer circumferential surface represents mirror surfaces in quantity corresponding to the number of sides the of the polygonal form. The closed member 118 is a member that closes an end portion on one side in the thrust direction in the dynamic pressure bearing, and it is fixed on the rotating body 107. Aluminum or an aluminum alloy is used for the rotating body 107, the polygon minor 116 and for the closed member 118. The rotating body 107 and the closed member 118 km space 118a that is closed for a portion except a gap between radial bearing 105 and the rotating body 107. Namely, the interspace 118a that is an end portion on one side in the thrust direction in the dynamic pressure bearing section that is composed of thrust bearing 104, radial bearing 105 and of the rotating body 107 is closed excluding a gap between radial bearing 105 and the rotating body 107. In the present example, the space 118a is formed by using also the closed member 118. Since the rotating body 107 and the closed member 118 form the closed space 118a as stated above, it is preferable that the materials for the rotating body 107 and the closed member 118 are the same.

The light deflection apparatus 101 is constructed as a motor of an axial type. Namely, stator coil 124 and magnet 125 are arranged to face each other in the thrust direction to be in parallel. Each of the stator coil 124 and magnet 125 is composed of a large number of coils and of a large number of magnets respectively, and these many coils and magnets are arranged to be in a ring shape on a circle that surrounds cylindrical member 110.

Member 110 that constructs the thrust bearing 104 and radial bearing 105 is made of aluminum or of an aluminum alloy.

Figure 3A:
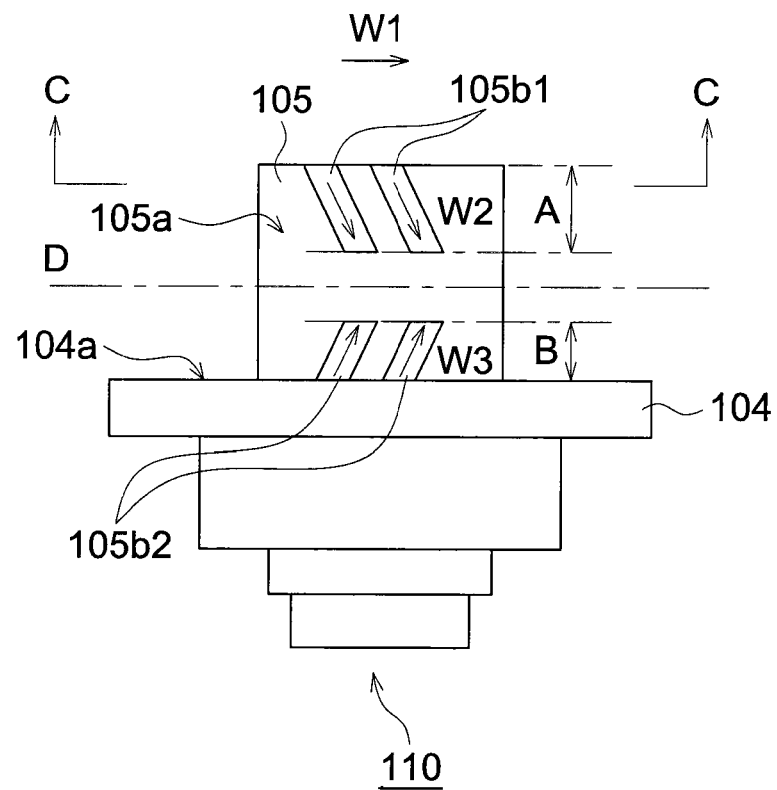
FIG. 3a is a diagram showing a radial bearing and a thrust bearing.
Figure 3B:
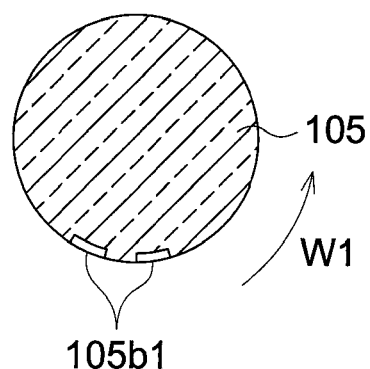
FIG. 3b is a diagram showing a radial bearing and a thrust bearing.

FIG. 3 shows a side view and a horizontal sectional view of member 110 constituting thrust bearing 104 and radial bearing 105. FIG. 3b is a sectional view taken on line C-C in FIG. 3a.

An outer circumference of cylindrical radial bearing 105 is dynamic pressure surface 105a, and on the dynamic pressure surface 105a, there are formed dynamic pressure generating grooves 105b1 and 105b2 as the first dynamic pressure generating groove. In detail, the radial bearing 105 has dynamic pressure generating groove 105b1 as the first dynamic pressure generating groove and dynamic pressure generating groove 105b2 as the first dynamic pressure generating groove both being arranged in parallel in the thrust direction, as shown in FIG. 3. Each of the dynamic pressure generating groove 105b1 and the dynamic pressure generating groove 105b2 is composed of two dynamic pressure generating grooves respectively. Dynamic pressure generating groove 105b1 positioned on the upper part in FIG. 3a is inclined downward from the upper portion on the left side to the lower portion on the right side. Dynamic pressure generating groove 105b2 positioned on the lower part in FIG. 3 is inclined upward from the lower portion on the left side to the upper portion on the right side. In the illustrated example, a depth and an inclination angle for the dynamic pressure generating groove 105b1 are the same as those for the dynamic pressure generating groove 105b2. Then, the grooves are formed so that they may be different in terms of a length. In FIG. 3, lengths of the grooves are indicated as A and B which are lengths in the thrust direction respectively for the dynamic pressure generating grooves 105b1 and 105b2.

That is, the dynamic pressure generating grooves 105b1 and 105b2 are formed so that length A of the dynamic pressure generating groove 105b1 may not be the same as length B of the dynamic pressure generating groove 105b2 (A≠B). In this way, the dynamic pressure generating grooves 105b1 and 105b2 are formed unsymmetrically about center line D of the space that separates the dynamic pressure generating grooves 105b1 and 105b2, namely, about center line D that is perpendicular to the thrust direction.

Incidentally, in the example shown in FIG. 3, two sets of grooves wherein the dynamic pressure generating grooves 105b1 and 105b2 are separated are formed. However, the dynamic pressure generating grooves 105b1 and 105b2 may also be formed to be continued. In the dynamic pressure generating grooves of this kind, a continuation section between the dynamic pressure generating groove 105b1 and the dynamic pressure generating groove 105b2 serves as a center line, and the dynamic pressure generating groove 105b1 and the dynamic pressure generating groove 105b2 are formed unsymmetrically about that center line.

Figure 4:
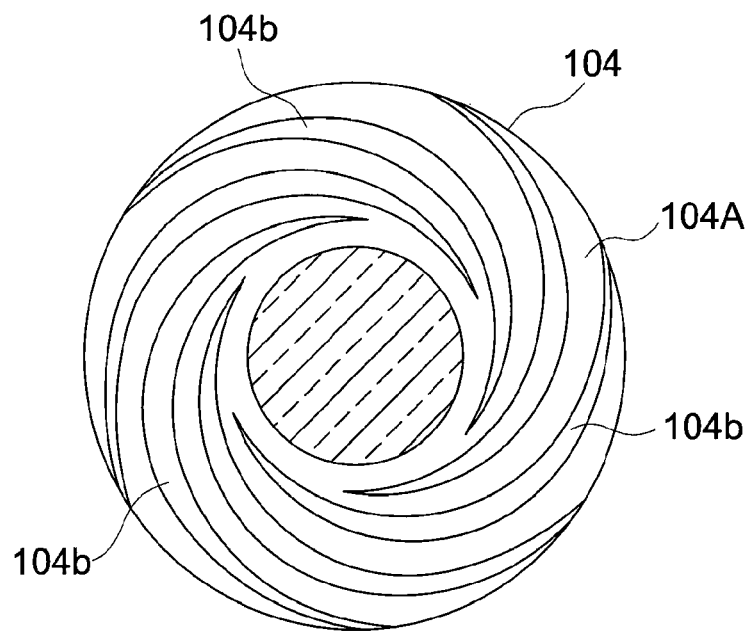
FIG. 4 is a diagram showing a dynamic pressure surface of a thrust bearing.

FIG. 4 is a top view of thrust bearing 104. On dynamic pressure surface 104a of the thrust bearing 104, there is formed dynamic pressure generating groove 104b representing involute second dynamic pressure generating groove.

Operations of the light deflection apparatus 101 explained above will be explained as follows.

When stator coil 124 is electrified with a driving electric current, rotor section 103 is rotated.

Due to high speed rotation, dynamic pressure by air is generated in a gap between thrust bearing 104 and rotating body 107, and dynamic pressure by air is generated in a gap between radial bearing 105 and rotating body 107, whereby, the rotor section 103 is caused to float to rotate at high speed.

In the case of high-speed rotation, the balanced state explained as follows is kept, and the rotor section 103 rotates stably.

$$F1+F2+F3+F4=0$$

In the expression above, F1 represents magnetic suction force between stator coil 124 and magnet 125, F2 represents dynamic pressure by air existing in a gap between thrust bearing 104 and rotating body 107, F3 represents force by an air pressure difference and F4 represents gravity generated by mass.

Figure 5:
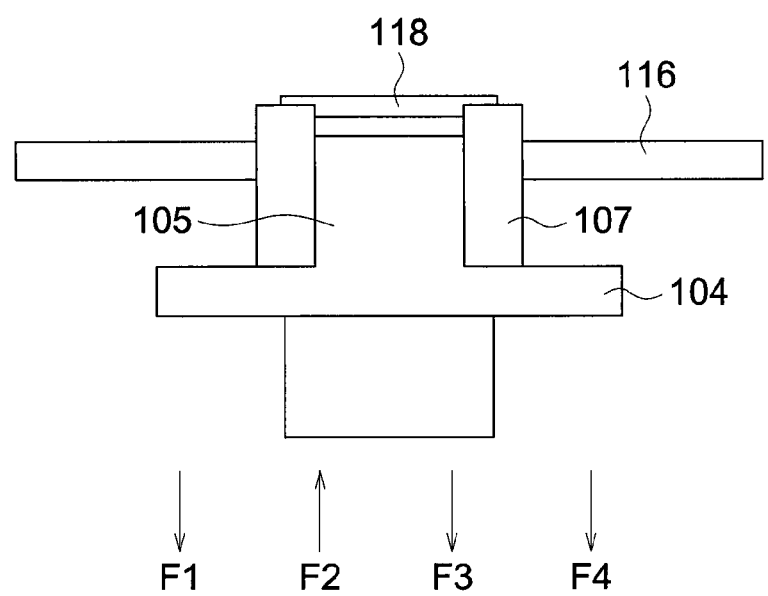
FIG. 5 is a diagram showing a relationship of various forces in the case of rotation of dynamic pressure bearing.

Directions of forces F1-F4 are shown in FIG. 5.

The magnetic suction force F1 is in a downward direction because it is a force by which the upper magnet 125 is pulled by the lower stator coil 124 toward to it. The dynamic pressure F2 is force generated by dynamic pressure generating groove 104b, and it is upward force that pushes the rotor section 103 upward. An air flow advancing downward in FIG. 3 is generated by dynamic pressure generating groove 105b that is formed on radial bearing 105, because A is larger than B. As a result, pressure in space 118a between radial bearing 105 and closed member 118 in FIG. 2 is lowered. Owing to this decompression, force F3 caused by an air pressure difference representing downward force is generated. Incidentally, force F3 caused by an air pressure difference can be adjusted by design of the dynamic pressure bearing section, as will be explained next. Gravity F4 is downward force that pulls rotor section 103 to the stator section 102 side.

As stated above, all of forces F1-F4 represent force acting in the thrust direction, and balanced relationship of these forces causes rotor section 103 to rotate at high speed stably. In particular, magnetic suction force F1 holds rotor section 103 stably, because both of stator coil 124 and magnet 125 are motors of an axial type which face in the thrust direction.

Under this balanced relationship of forces, tight closing of closed member 118 makes it difficult for the dynamic pressure bearing section to be affected by shocks and force from the outside. Namely, by making one end portion of the dynamic pressure bearing section in the thrust direction to be of an airtight type, balanced relationship of the aforesaid various forces can be maintained stably, resulting in a structure of the dynamic pressure bearing section that is hardly affected by the outside effects. As a result, the rotor section 103 can rotate stably. When the structure is not a closed type, the balanced relationship expressed by the aforesaid expression tends to be lost, and rotation of the rotor 103 is destabilized.

Next, force F3 caused by an air pressure difference will be explained. Force F3 caused by an air pressure difference is force generated in radial bearing 105. Namely, it is force generated by relationship between an air flow shown with arrow W2 and an air flow shown with allow W3 in FIG. 3 a In other words, force F3 caused by an air pressure difference is generated by relationship between dynamic pressure generating groove 105b1 and dynamic pressure generating groove 105b2. When dynamic pressure generating groove 105b1 and dynamic pressure generating groove 105b2 are line-symmetric about center line D that passes through midpoint between the lower end of dynamic pressure generating groove 105b1 and the upper end of dynamic pressure generating groove 105b2, force F3 caused by an air pressure difference is zero because the air flow shown with arrow W2 is the same as the air flow shown with arrow W3. Namely, force to push up or to push down rotor section 103 is not generated by dynamic pressure generating grooves 105b1 and 105b2. When dynamic pressure generating groove 105b1 and dynamic pressure generating groove 105b2 are not line-symmetric about center line D, force to move rotor section 103 in the thrust direction is generated from dynamic pressure generating grooves 105b1 and 1052.

When force F3 caused by a pressure difference is zero, namely, when force to move rotor section 103 in the thrust direction is not generated by dynamic pressure generating grooves 105b1 and 105b2, rotor section 103 is not stable in the thrust direction in the course of high speed rotation. Therefore, light deflection apparatus 101 turns out to be affected easily by external force, and the rotor section 103 sometimes comes off when the light deflection apparatus 101 is inflicted by shocks or external force.

By making force F3 caused by an air pressure difference not to be zero, namely, by making force to move rotor section 103 in the thrust direction to be generated by dynamic pressure generating grooves 105b1 and 105b2, stability in the rotation movement of rotor section 103 is increased, resulting in the state wherein the rotor section 103 hardly comes off even when shocks and external force are inflicted.

In the example shown in FIG. 3, two dynamic pressure generating grooves 105b1 are provided on an outer circumference of radial bearing 105. Two dynamic pressure generating grooves 105b2 also are provided on an outer circumference of radial bearing 105. As illustrated, dynamic pressure generating grooves 105b1 and dynamic pressure generating grooves 105b2 are provided to be in parallel in the axial direction, and to be in the same angular position in the rotational direction.

When rotating body 107 rotates so that a portion on an inner circumferential surface of rotating body 107 that faces dynamic pressure generating grooves 105b1 and dynamic pressure generating grooves 105b2 may move in the direction shown with arrow W1, dynamic pressure shown with downward arrow W2 is generated in dynamic pressure groove 105b1, and dynamic pressure shown with upward arrow W3 is generated in dynamic pressure generating groove 105b2.

By causing dynamic pressure generating groove 105b1 and dynamic pressure generating groove 105b2 to be asymmetric about center line D as shown in FIG. 3, stability of light deflection apparatus 101 against external force is improved.

Incidentally, with respect to a device to generate force F3 caused by an air pressure difference, it is possible to adjust relationship between dynamic pressure generating grooves 105b1 and 105b2 by changing a depth of a groove or an inclination angle of a groove in addition to a length of a groove, and it is further possible to use any two or more of these three factors by combining them.

In the example shown in FIG. 3, space 118a is decompressed by making A to be greater than B.

When rotating body 107 rotates so that a portion on an inner circumferential surface of the rotating body 107 facing the dynamic pressure generating grooves 105b1 and 105b2 may move in the direction shown with arrow W1, dynamic pressure shown with downward arrow W2 is generated on the dynamic pressure generating groove 105b1, while, upward dynamic pressure shown with arrow W3 is generated on the dynamic pressure generating groove 105b2. When causing A to be greater than B, the downward dynamic pressure becomes to be stronger than an upward air flow, and space 118a is decompressed.

Prevention of coming off of rotor section 103 by decompression of space 118a is carried out as follows. F1+F2+F4 becomes an upward resultant force in FIG. 5. Force F3 caused by an air pressure difference negates this upward resultant force to stabilize the rotor section 103 and to prevent its coming off.

Incidentally, there is sometimes an occasion wherein pressure in the space 118a is made to be higher than atmospheric pressure depending on the construction of an apparatus, namely, there is sometimes an occasion to increase a pressure depending on the construction of an apparatus. In this case, dynamic pressure generating grooves 105b1 and 105b2 which make B to be greater than A, for example, are formed.

Figure 6:
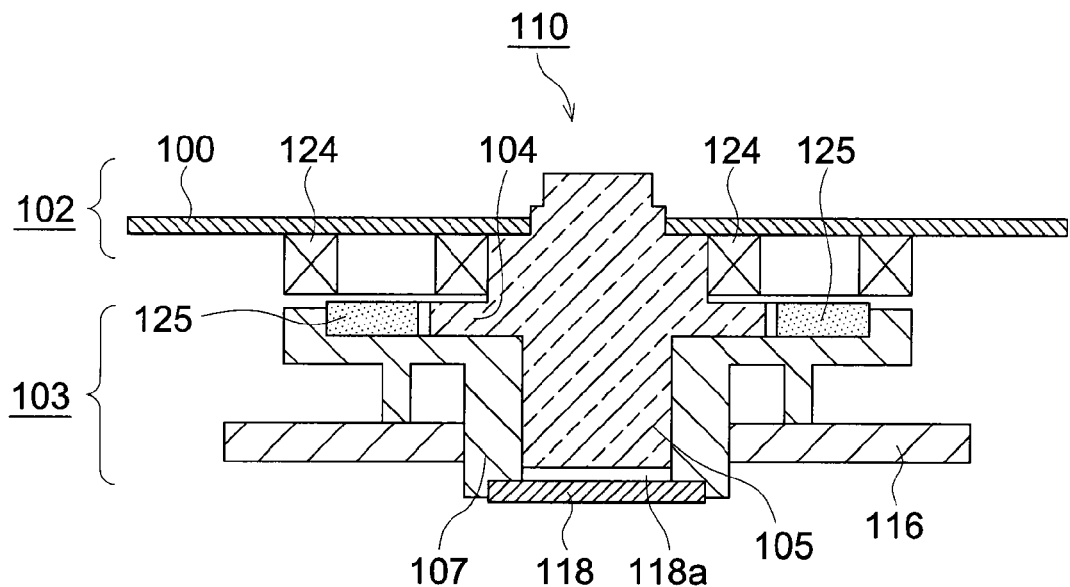
FIG. 6 is an enlarged diagram of a sectional view showing an entire structure of an example of a light deflection apparatus relating to the embodiment of the invention.

Depending on relationship with other parts, light deflection apparatus 101 is incorporated in an image forming apparatus in various directions. FIG. 6 shows an example of the light deflection apparatus 101 wherein base plate 100 is positioned to be at an upper part. In the light deflection apparatus 101 in FIG. 6, gravity F4 in the aforesaid expression F1+F2+F3+F4=0 is in the opposite direction relatively to other forces F1-F3 in relationship with them.

In the example shown in FIG. 6, gravity F4 acts in the direction to separate rotor section 103 from stator section 102. When the example shown in FIG. 6 is applied to the indication shown in FIG. 5, magnetic suction force F1 and dynamic pressure F2 are in the opposite direction to those shown in FIG. 5, if the aforesaid example is indicated downward with gravity F4 serving as a standard. The example shown in FIG. 3 is in the structure wherein resultant force F1+F2+F4 is force to act to separate rotor section 103 from stator section 102, and force F3 caused by an air pressure difference negates this resultant force F1+F2+F4.

In the example shown in FIG. 6, gravity F4 acts to separate rotor section 103 from stator section 102. Therefore, in the example shown in FIG. 6, coming off of rotor section 103 is prevented by enhancing the degree of vacuum of space 118a by making A to be longer than B in the extent which is higher than that in the example shown in FIG. 3.

Figure 7:
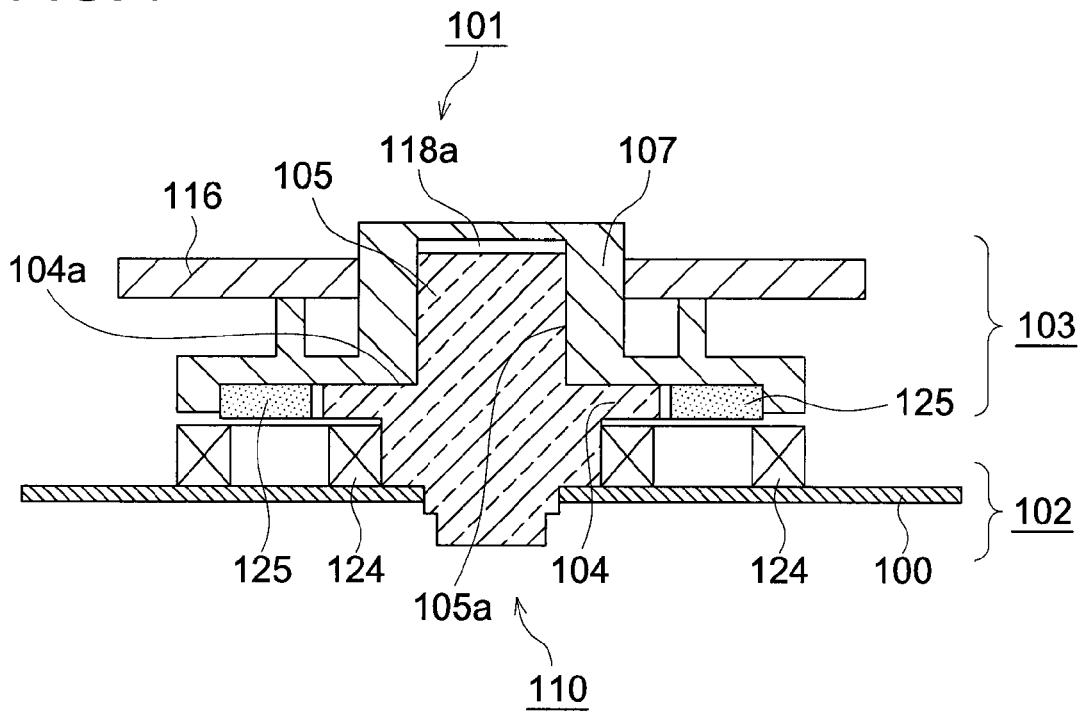
FIG. 7 is a diagram showing another example of a light deflection apparatus relating to the embodiment of the invention.

FIG. 7 shows another example of a light deflection apparatus relating to the embodiment of the invention.

In the example shown in FIG. 7, an end portion on one side of dynamic pressure bearing in the thrust direction is closed by rotating body 107. Namely, the end portion is not closed tight by member 118 that is separate from rotating body 107 as in the example shown in FIG. 2, but the end portion in the thrust direction is closed tight by rotating body 107. As is illustrated, space 118a that is an end portion on one side of a dynamic pressure bearing composed of thrust bearing 104, radial bearing 105 and of rotating body 107 in the thrust direction is closed tight by radial bearing 105 and by rotating body 107 excluding a gap between dynamic pressure surfaces of radial bearing 105 and rotating body 107.

In the present embodiment, an end portion on one side in the thrust direction of dynamic bearing section is closed tight. Owing to the closed structure of dynamic pressure bearing section, stability against shocks and force from the outside is improved, and coming off of the rotor section is prevented sufficiently.

What is claimed is:

1. A light deflection apparatus, comprising:
    a stator section including a radial bearing having a first dynamic pressure generating groove, a thrust bearing having a second dynamic pressure generating groove, and a stator coil; and
    a rotor section including a polygon mirror, a magnet facing the stator coil, and a rotating body having a first dynamic pressure surface facing the radial bearing and a second dynamic pressure surface facing the thrust bearing, the rotor section supporting the polygon mirror and the magnet;

wherein:

the stator coil and the magnet are arranged to face each other in a thrust direction and in parallel;

the thrust bearing, the radial bearing and the rotating body form a dynamic pressure bearing section, and one end portion of the dynamic pressure bearing section in the thrust direction is closed excluding a gap between the radial bearing and the rotating body;

the first dynamic pressure generating groove comprises an upper dynamic pressure generating groove at an upper part of the radial bearing and a lower dynamic pressure generating groove at a lower part of the radial bearing;

the upper dynamic pressure generating groove and the lower dynamic pressure generating groove are asymmetric about a center line which extends between the upper dynamic pressure generating groove and the lower dynamic pressure generating groove in a direction perpendicular to the thrust direction; and at least one of a depth of the first dynamic pressure generating groove, an inclination angle of the first dynamic pressure generating groove, and a length of the first dynamic pressure generating groove is different between the upper dynamic pressure generating groove and the lower dynamic pressure generating groove such that the upper dynamic pressure generating groove and the lower dynamic pressure generating groove generate different dynamic pressures.

2. The light deflection apparatus of claim 1, wherein the one end portion of the dynamic pressure bearing section in the thrust direction communicates with an outside through the gap between the radial bearing and the rotating body.

3. The light deflection apparatus of claim 1, wherein the rotor section is arranged to have an upper position with respect to the stator section.

4. The light deflection apparatus of claim 1, wherein the rotor section is arranged to have a lower position with respect to the stator section.

5. The light deflection apparatus of claim 1, wherein the rotor section comprises a closed member closing the one end portion of the dynamic pressure bearing section in the thrust direction.

6. The light deflection apparatus of claim 1, wherein the rotating body and the closed member are made of a same material.

7. A light deflection apparatus, comprising:

a stator section including a radial bearing having a first dynamic pressure generating groove, a thrust bearing having a second dynamic pressure generating groove, and a stator coil; and a rotor section including a polygon mirror, a magnet facing the stator coil, and a rotating body having a dynamic pressure surface facing the radial bearing and a dynamic pressure surface facing the thrust bearing, the rotor section supporting the polygon mirror and the magnet;

wherein:

the stator coil and the magnet are arranged to face each other in a thrust direction and in parallel;

the radial bearing and the rotating body form an almost closed space;

the first dynamic pressure generating groove comprises an upper dynamic pressure generating groove at an upper part of the rotating body and a lower dynamic pressure generating groove at a lower part of the rotating body;

the upper dynamic pressure generating groove and the lower dynamic pressure generating groove are asymmetric about a center line which extends between the upper dynamic pressure generating groove and the lower dynamic pressure generating groove in a direction perpendicular to the thrust direction; and at least one of a depth of the first dynamic pressure generating groove, an inclination angle of the first dynamic pressure generating groove, and a length of the first dynamic pressure generating groove is different between the upper dynamic pressure generating groove and the lower dynamic pressure generating groove such that the upper dynamic pressure generating groove and the lower dynamic pressure generating groove generate different dynamic pressures.

8. The light deflection apparatus of claim 7, wherein the closed space communicates with an outside through a gap between the dynamic pressure surface of the radial bearing and the dynamic pressure surface of the rotating body.

9. The light deflection apparatus of claim 7, wherein the closed space is closed excluding a gap between the dynamic pressure surface of the radial bearing and the dynamic pressure surface of the rotating body.

* * * * *